Dec. 3, 1929.  F. H. FRANSON  1,738,239
WATCH CONSTRUCTION
Filed June 9, 1927
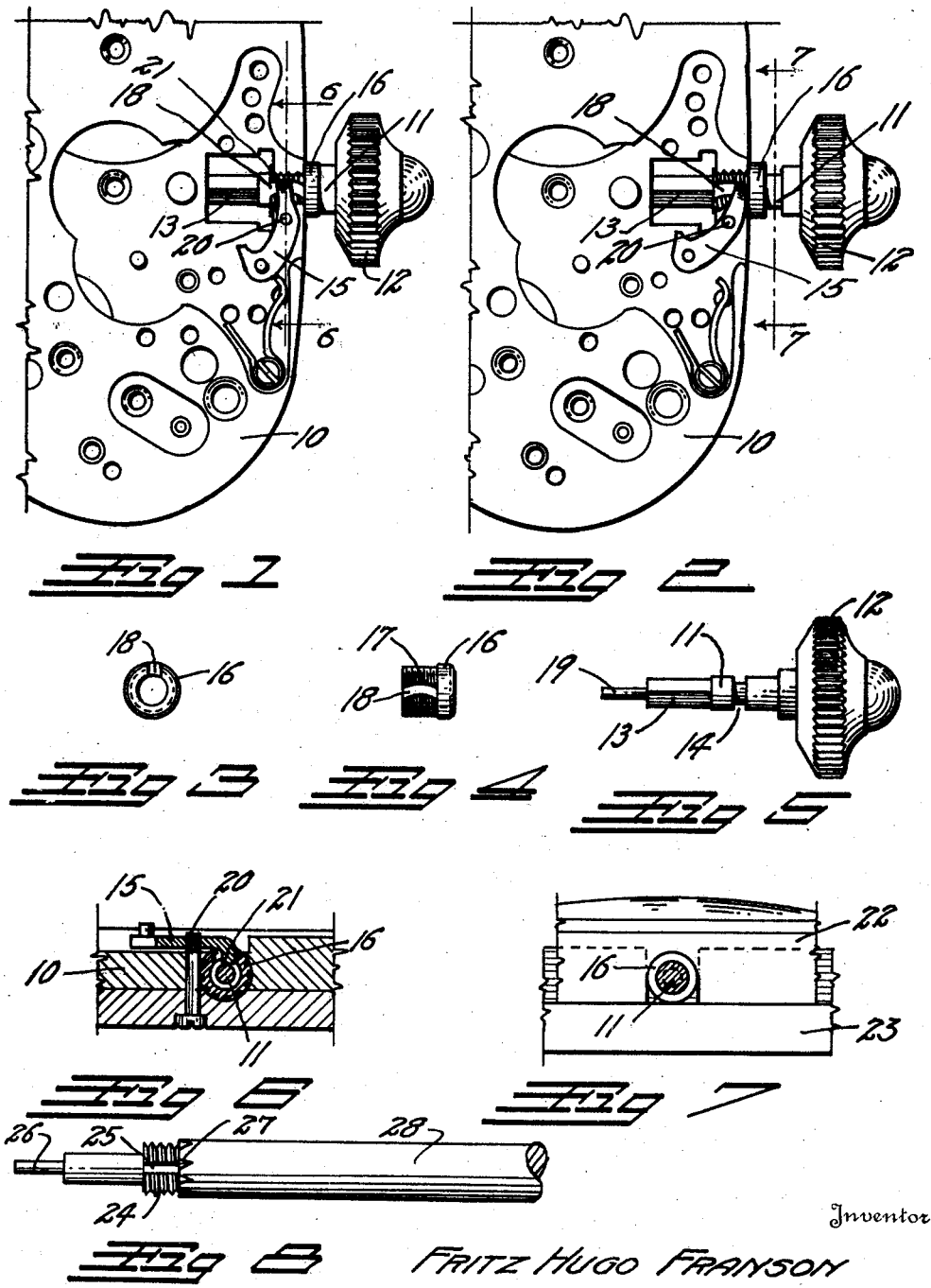
Inventor
FRITZ HUGO FRANSON
By [signature]
Attorney Patented Dec. 3, 1929

1,738,239

UNITED STATES PATENT OFFICE

FRITZ HUGO FRANSON, OF DENVER, COLORADO

WATCH CONSTRUCTION

Application filed June 9, 1927. Serial No. 197,573.

This invention relates to a means for carrying the stem of small watches, of the wrist watch type. Watches of this type at present carry the stem in a bearing formed in the movement plate, the withdrawal of the stem being limited only by the set lever. The constant pulling of the stem outwardly to set the watch wears away the bearing in the soft metal of the movement plate and wears the set lever, and the groove in the stem which receives the set lever, so that the stem soon becomes loosened and may be pulled out of the movement. The loosening of the stem also allows the winding pinion to become separated from the winding gear causing stripping of the teeth from the gear and pinion. This looseness also allows dust and dirt to enter between the stem and the movement frame and the case requires frequent cleaning of the movement.

The principal object of this invention is to provide a support for the stem which will obviate all of the above difficulties.

Another object of the invention is to provide a bearing for the stem which will act as a stop to limit the movement of the set lever and thus relieve the set lever pivot screw from strain created by pulling on the stem.

A further object of the invention is to provide bearing means for the stem, to which, the two halves of the case will fit tightly so as to prevent the entrance of dust into the case.

Other objects and advantages reside in the detail construction of the invention, which is designed for simplicity, economy and efficiency. These will become more apparent from the following description.

In the following detailed description of the invention, reference is had to the accompanying drawing, which forms a part hereof. Like numerals refer to like parts in all views of the drawing and throughout the description. All of the views are greatly magnified, they being drawn to a scale approximately six times actual size.

In the drawing:

Fig. 1 illustrates a partial plan view of the rear movement plate, with all pinions, shafts, and gears removed. In this view, the stem is illustrated in the winding position.

Fig. 2 is a similar view with the stem in the setting position.

Fig. 3 is a face view of the improved means for supporting the stem, which I will hereinafter designate the bearing.

Fig. 4 is a side view of the bearing.

Fig. 5 is a detail side view of the stem.

Fig. 6 is a cross section through the stem and bearing, taken on the line 6—6, Fig. 1.

Fig. 7 is a cross section taken on the line 7—7, Fig. 2. In this section, however, the watch case has been put in place.

Fig. 8 illustrates a tap for forming the threads in the plate to receive the bearing.

As illustrated, the movement plate of a watch is designated in its entirety by the numeral 10, the winding stem at 11, with its knurled crown at 12. The stem 11 is provided with the usual squared portion 13 for receiving the usual winding pinion and the clutch pinion, and peripheral groove 14 for receiving a bent-down extremity 21 on a set lever 15. An aligning tip 19 is formed on the stem 11 to maintain it in alignment with a terminal bearing in the plate 10.

At the point where the stem 11 enters the movement plate 10, I tap an enlarged opening for the reception of a bearing 16. The bearing 16 is preferably made of steel and tempered so as to eliminate wear and is provided with a threaded portion 17, by means of which, it is threaded into the tapped opening in the frame 10. In one side of the threaded portion 17, an arcuate slot 18 is punched. The turned extremity 21 of the set lever 15 passes through this slotted opening 18 to engage in the peripheral groove 14 of the stem 11. The set lever 15 is carried on the usual threaded pivot 20 and the arc of the slot 18 is cut on a circumference around this pivot.

Since the bearing 16 is hardened, very little wear will occur between it and the stem 11 so that the stem will be always maintained rigidly in alignment and stripping of the teeth of the winding gears is eliminated. The maintaining of the stem in alignment is assisted by the fact that since the bearing 16 extends beyond the frame 10, it has a greater length than the usual bearing.

It is desired to call attention to the fact that in the usual construction, the outward movement of the stem is only limited by the movement of the set lever 15 so that the entire strain of stopping the movement of the stem is thrown upon the set lever and the pivot 20. In the present construction, however, the movement is limited by the length of the slot 18 in the bearing 16, that is, when the extremity of the set lever contacts with the extremity of the slot the stem cannot be pulled further from the watch, and since wear and looseness is prevented, the stem will not become disengaged from the extremity of the set lever and cannot be pulled from the watch without removing the set lever.

In Fig. 7, I have illustrated the position of the watch case relative to the bearing 16. In this view, the lower half of the case is shown at 23 with its upper edge provided with a notch, the bottom of which is curved to fit snugly against the lower half of the bearing 16. The upper half of the case is illustrated at 22 with a similar notch arranged to engage the upper half of the bearing 16. By this construction, a tight joint is insured entirely around the bearing and, since the bearing is stationary, there is no wear or tendency to looseness between the bearing and the case, thus a permanently dust-tight joint is assured.

In the present construction of watches of this character, the stems are of softer metal than the set levers. Therefore, the set lever indents the sides of the groove 14 and raises a burr or projection on the side of the stem. As the stem is pulled out and pushed in this burr acts as a cutter to cut away the bearing in the plate 10 which is of still softer metal. In this invention, the hardened bearing 16 quickly smooths out any burrs on the stem without damage.

In Fig. 8, I have illustrated at 28, a tap for forming the threads in the plate to receive the bearing. The tap threads are shown at 24 with cutting edges at 25. The tool is provided with a guide 26 which fits into the terminal bearing in the plate 10 designed to receive the tip 19 of the stem.

In use, the tap 28 is placed into the opening in the plate 10 designed for the reception of the stem 11 with the guide 26 in the terminal bearing. The tap is then rotated, the cutting edges 25 forming a duplicate female thread of the threads 24 in the plate 10. The guide 26 insures that these threads will be in alignment and concentrically surround the axis of the stem 11 when the bearing 16 is threaded in place.

Reaming teeth 27 are formed immediately back of the teeth 24 on the tap 28. These teeth are for the purpose of reaming the slots in the two sections of the watch case 22 and 23, and will form the slots to a diameter equal to that of the tap 28, the tap being formed with a diameter equal to the projecting portion of the bearing 16. Thus a single tool is provided which forms the threads in the plate, aligns the threads with the axis of the stem and cuts the opening in the case to fit against the bearing.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. In a watch having a stem with a peripheral groove adapted to receive the extremity of a set lever, means for limiting the movement of said set lever comprising a stationary bearing for said stem; a slot formed through one side of said bearing and adapted to allow said set lever to pass therethrough into engagement with said stem, said set lever being pivoted and said slot being cut on a circumferential arc about said pivot.

2. Means for supporting a watch stem within a movement plate comprising a threaded sleeve adapted to slidably receive said stem and arranged to be threaded into said plate, said sleeve projecting beyond said plate when in place and having a slot adapted to receive the extremity of a set lever, said slot terminating at said projecting beyond portion so that said projecting beyond portion acts as a stop for said set lever.

3. Means for supporting a watch stem within the movement plate of a watch comprising a cylindrical sleeve adapted to surround said stem within said movement plate; said sleeve being rigidly supported by said plate; an enlarged portion on said sleeve adapted to be clamped against said plate so as to set the position of said sleeve therein; an arcuate slot in one side of said sleeve and a pivoted set lever adapted to extend through said slot into said stem so as to allow a longitudinal movement of said stem but prevent withdrawal thereof.

4. Means for limiting the movement of a set lever in a watch plate comprising a bushing threaded into said movement and adapted to surround the stem thereof; an enlarged annular extremity on said bushing, there being an arcuate slot extending through one wall of said bushing for the reception of said set lever, said annular enlargement acting as a stop for the movement of said set lever within said slot.

In testimony whereof, I affix my signature.

FRITZ HUGO FRANSON.